3,428,393
OPTICAL DISSECTOR
Roger Lannes de Montebello, 165 E. 66th St.,
New York, N.Y. 10021
Continuation-in-part of application Ser. No. 464,937,
June 18, 1965. This application Nov. 5, 1965, Ser.
No. 506,453
U.S. Cl. 352—43     13 Claims
Int. Cl. G03b 35/18

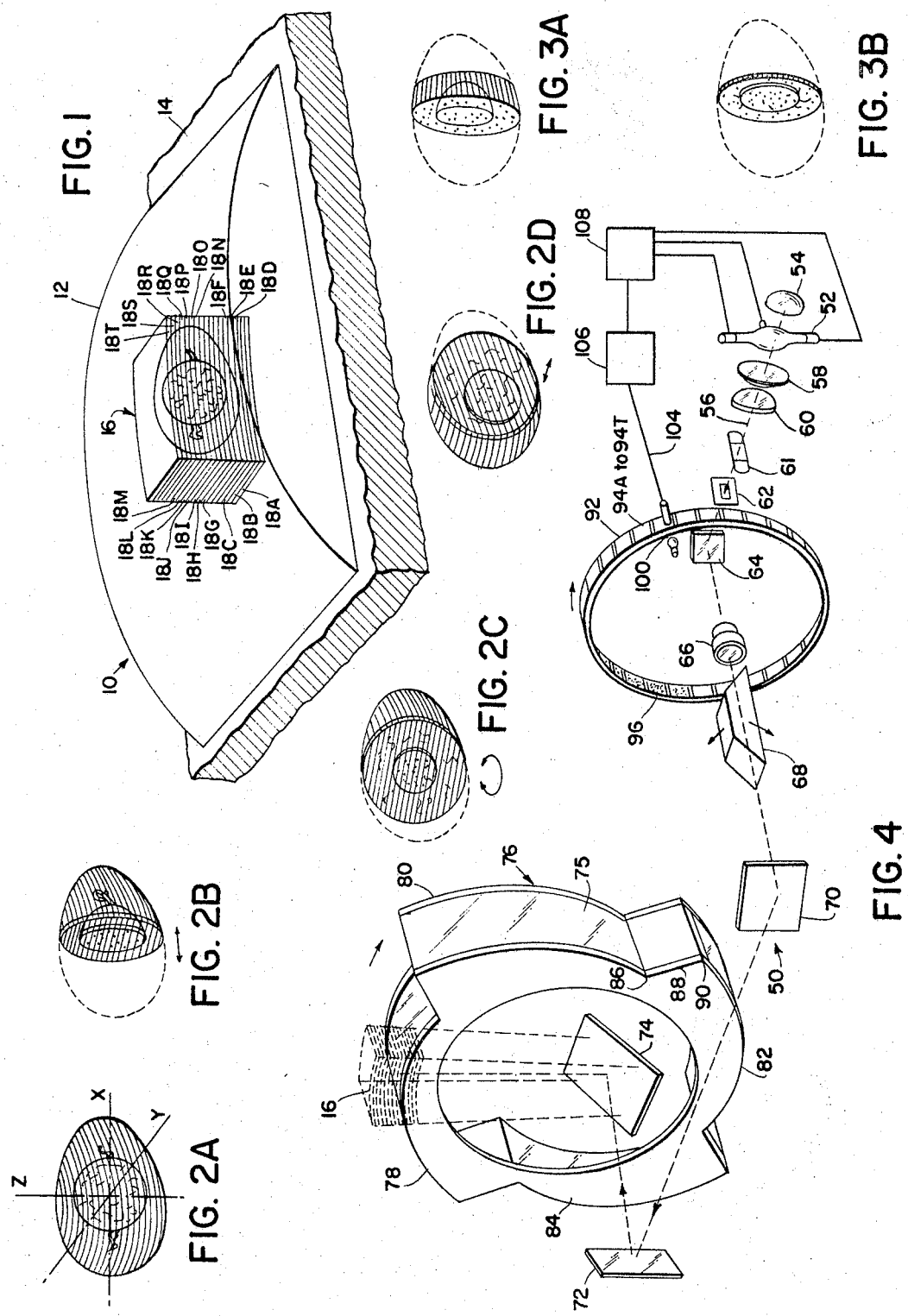

ABSTRACT OF THE DISCLOSURE

In forming and displaying a three-dimensional image of an object by projecting successively two-dimensional images of successive sections of the object on a screen that moves back and forth in the optical path, optical dissection of the three-dimensional image of the object is achieved by varying with a mask the amounts of light transmittance to different portions of the screen so that a selected portion of the three-dimensional image appears brighter than another portion.

---

This application is a continuation-in-part of copending application Ser. No. 464,937, filed June 18, 1965.

The present invention relates generally to a method and apparatus whereby serial sections or strata through an object are recorded photographically, or otherwise reproduced, in one or more steps and displayed in their natural sequence and respective orientation as a composite three-dimensional image.

More particularly the invention relates to novel methods of, and apparatus for, rendering visible predetermined portions of a three-dimensional image during direct observation of it as an optical transparent solid which portions might otherwise be obscured by the presence of other portions.

In the present invention two-dimensional information is displayed in such a way as to take on a three-dimensional and transparent character. The information fed into the apparatus is in the form of X–Y functions which are thereafter oriented along a Z axis. By X–Y functions are meant two-dimensional bits of information which are defined by their X and Y coordinates in one plane. These X–Y functions are connected in concept to one another by having common orientation along a Z axis. The entire fund of information is then displayed with the X, Y and Z axes (and the corresponding X–Y, Y–Z, and X–Z planes) in substantially their original relative position to one another.

The invention is thus distinguished from prior art devices in which information is displayed based on orientation with a point or plane or axis, or one of them, occurring outside the bit of information, or the total fund of bits of information, which are utilized to produce a three-dimensional image from two-dimensional bits of information.

The term "photographic" here is meant to encompass light sensitive means, as well as magnetic and electronic means of still and animated recording, etc., and by "photograph" is meant the product of such recording. The word, "section" is applied generally to physical planar specimens (as obtained, for example, with a microtome), or to reproductions thereof; also to photomicrographic, radiographic ultrasonic and other records of thin strata brought to "focus" within uncut specimens. (In high power microscopy, only very thin layers within a specimen can be observed at a time, in view of the exceedingly shallow depth of field available at high magnifications; similarly, in roentgenology, the known methods of "tomography" or "laminagraphy" provide records of serial strata within a living organism, which are closely comparable in nature to photomicrographic strata records.) The term "section" is applied also to drawings or other graphic representations of strata through real or imaginary objects, to elements of time sequences (motion pictures, cathode ray tube screen images, etc.) to elements of tri-coordinate functions, such as may be obtained from computers and, in general, to two-dimensional components of three-dimensional objects. For convenience, the invention will be described with regard to concrete solid objects.

It is known that, once a series of sections have been obtained from a specimen, for example in biological or anatomical study, researchers often find it difficult, when inspecting the sections individually, to visualize in three dimensions the spatial relationship existing among structural details. In those cases, the researcher is compelled to somehow rearrange the sections in space in their natural order. This may be achieved either in abstract fashion by computation, or concretely by physically or optically "stacking" the sections themselves, or their images, or reproductions thereof.

A number of methods have been developed for the physical stacking of enlarged photographs or drawings of the sections, on plastic, glass, or wax sheets, or the like. Such methods are tedious, lengthy (taking from weeks to months), and the results are usually frustrating: the sections are either too few or too numerous; when they are too few, interpolation is difficult and uncertain; when their number is increased, the accumulation of many sections interferes with the direct overall observation, either because of density addition and turbidity or because of refraction within the material, which further limits the visibility and distorts the inner structural detail.

Optical stacking does not present the same problems, and devices have been proposed for optical stacking in microscopy. In the latter devices, the stage or the objective is "vibrated" with such frequency and amplitude that the resulting sequence of aerial images of the strata successively brought to focus is projected onto a small screen which also vibrates. The vibration phases, respectively, of the objective or stage, and of the screen, are adjusted in such a way that the screen moves in unison with the objective or stage, but with greater amplitude. Thus, a "smear" solid image of the specimen is built in the space swept by the moving screen. This proposition has met with some serous obstacles, for example, lack of contrast, and flare due to magnification and to the background brightness, as well as the considerable light scattering caused by the relative thickness of the specimen, all of which severely degrade the compound image. Various authors have proposed means for optically generating a solid by causing to rotate or reciprocate an image receiving surface, thereby causing this surface to sweep a volume of space while a series of images is formed thereon, but without success.

Co-pending application Ser. No. 464,937, disclosed a method and apparatus for displaying in space, in their natural spatial relationship, and sequentially, images of at least part of a series of sections, following a cycle having a frequency and an amplitude such that a three-dimensional, transparent image of the series may be formed, by conversion of the time coordinate into a space coordinate; the three-dimensional image is capable of being directly observed without the refractive distortions and other interferences characteristic of physical stacking, and is also capable of being photographically recorded.

In the known methods and apparatus for three-dimensional display the entire three-dimensional image has appeared uniformly illuminated. Any variations in illumination were due to deficiencies in the method or apparatus used and were not controlled. The prior art afforded no method or apparatus for emphasizing features of three-dimensional display images by selective control of illumination of portions of the image. It is an object of the present invention to provide methods and apparatus for illuminating selected zones of three-dimensional images with selectively different degrees of brightness.

It is a further object to provide methods and apparatus for gradually changing the shape, width and position of selectively illuminated zones of a three-dimensional image in such manner that one or more relatively thin or thick new sections perpendicular to the planes of the initial sections may be made to slowly traverse the three-dimensional image in the desired direction, revealing successive new sections, while part or all of the remainder of the three-dimensional image is relatively less brightly illuminated.

It is a further object of the present invention to provide methods and apparatus for gradually changing the shape, width and position of selectively illuminated zones of a three-dimensional image such that one or more relatively thin or thick new sections may be made to slowly rotate in a desired direction through the planes of the original sections, thereby revealing successive new sections while part or all of the remainder of the three-dimensional image is relatively less illuminated.

It is an object of the present invention to improve on my earlier filed application by providing a method and apparatus for revealing structural detail of a desired section or segment of the reproduced image by effectively removing extraneous structural details nearer to or farther from the observer, which extraneous details obscure, rather than aid, observation.

Other objects, features and advantages of the invention will appear from the detailed description of an illustrative form of the same, which now will be given in conjunction with the accompanying drawings, in which:

FIGURE 1 is a schematic perspective view of a portion of the apparatus illustrating a three-dimensional image reconstructed from sections of a solid specimen by the method and apparatus of copending application Serial No. 464,937;

FIGURES 2A–2D and 3A–3B are perspective views of a three-dimensional image reconstructed from sections of a solid specimen as displayed using the method and apparatus of this invention;

FIGURE 4 is a schematic view of one embodiment of apparatus for practicing the present invention;

In all forms of the present invention a special mask is used. The mask operates as an optical dissector or "knife." The mask 346, as may be seen in FIGURE 10, consists preferably of three adjacent zones: first an opaque zone 350, next a narrow clear zone 354, and finally a transparent but darker zone 352. The transparent but darker zone may have a low transmittance, say ten percent, or density $D=1.00$. The central clear zone is preferably much narrower than the other two, rather like a slit. The width of the clear zone determines the minimum thickness of a section which may be emphasized for examination. As may be seen in FIGURE 4, the mask is disposed in a light path and associated with appropriate optics in such a manner as to be effectively focused on the various planes of three-dimensional images produced as described below. Moving the mask through the light path causes the three zones respectively to obliterate, to illuminate brightly, and to illuminate dimly corresponding zones of each of the three-dimensional images. The mask is slidable and rotatable so that at any time the position or the orientation of its image on the screen may be changed.

Figure 11:
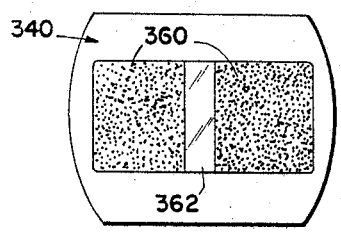
FIGURES 11, 12, 13 and 14 are alternate embodiments of the mask of the present invention.
Figure 12:
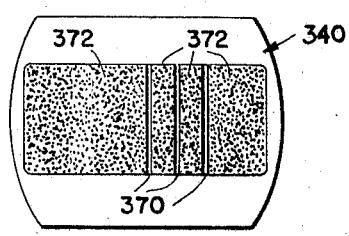

FIGURE 11 shows an alternate embodiment of the mask which consists of two opaque zones 360 defining a relatively wide clear zone or slit 362. FIGURE 12 shows another embodiment in which a plurality of clear zones 370 are defined by a plurality of opaque zones 372.

Figure 13:
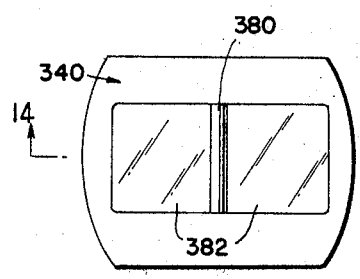
Figure 14:
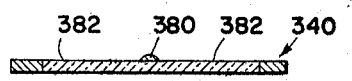

FIGURES 13 and 14 show still another embodiment in which a cylindrical lens 380 is disposed between clear zones 382 and serves to focus light in a tall, narrow pattern across the optical path and so emphasize a section by concentration of light without reducing the total amount of illumination of the reproductions. It has been found particularly advantageous in some embodiments to substitute a transparent material of slightly reduced transmittance for the clear zones 382.

FIGURE 1 shows the three-dimensional image as it may be produced according to the disclosure of copending application 464,937.

FIGURE 2A shows a complete three-dimensional image as it would appear under viewing conditions. One form of optical dissection (analysis) may be achieved by optically blocking a segment of the three-dimensional image while optically dimming all of the unblocked segments of the synthesis except the end portions adjacent the blocked segment. The end portions thus are made to stand out as a bright vertical section, still connected to the dimmer portions of the image with which it is easily identified. This form may be produced by the mask of FIGURE 10 and is illustrated in FIGURE 2B. Selective illumination may be effected in any plane perpendicular to the original sections, thereby cutting through the optically stacked original sections and revealing as yet unexplored aspects of the object. As further described below, the bright vertical section may be made to traverse back and forth across the image.

In another form of optical dissection the bright vertical section may be made to rotate about its vertical axis in order to reveal other structural detail in different areas. This is illustrated in FIGURES 2C and 2D.

Also by placing opaque zones on both sides of the slit an isolated section may be seen. The section thickness may be varied by varying the slot width. The image produced by the relatively wide slit of FIGURE 11 is illustrated in FIGURE 3A. The image produced by a narrow slit is illustrated in FIGURE 3B. The images of FIGURES 3A and 3B may also be produced by the cylindrical lens mask of FIGURES 13 and 14 under ideal optical conditions.

The invention may be practiced by preparing a plurality of two-dimensional photographs of successive sections of a three-dimensional object, and arranging the photographs in apparatus adapted to display them in a coordinated manner. The apparatus is capable of a number of embodiments hving the following elements in common: an optical system made up of lenses, prisms, mirrors, etc., and defining an optical path, a plurality of two dimensional photographs arranged to pass through the optical path, and a light source adapted to illuminate each photograph as it is centered in the optical path. The illuminated photographs may be mounted on a suitable viewing screen for direct viewing, but preferably their images are projected onto a projection screen. The viewing screen may be clear or diffusing so long as it permits light to pass through to illuminate the photograph which may be self-diffusing or clear. The projection screen must have a diffusing surface in order to display an image. In all embodiments the screen surface must move back and forth along the optical path. Some of the embodiments differ from others in the means to accomplish such motion.

The photographs are synchronized with the motion of the screen so that the photograph of one extreme section is displayed on the screen surface at one extreme of its travel, and the photograph of the other extreme section is displayed on the screen at the other extreme of its travel, with the photographs of intermediate sections displayed at appropriate points between the two extremes of screen travel. The photographs used in the practice of the invention may consist of individual two-dimensional still pictures of a three-dimensional object, such as a biological specimen, taken as it is dissected layer by layer. Each individual photograph is a reproduction of a distinct section, preferably planar, of the object. The photographs are preferably arranged in a holder so that successive photographs are reproductions of successive layers of the object. It is to be understood that a loop of motion picture film may be substituted for individual photographs mounted in the holder, and projection apparatus may be used to display them successively on the screen. Mechanical friction and other stresses may be virtually eliminated by tightly holding the film on the inner or the outer surface of a rotating, transparent drum. Similarly, for longer film strips the film may be held on a transparent flexible belt provided with sprocket holes or with ridges for enmeshing sprocketed pulleys.

An electronic multiple microflash tube may be used to achieve high-frequency projection, in some advantageous embodiments up to about 1200 or more light pulses per second. For best results the light pulse persistence is of short enough duration visually to substantially "stop" each successive frame, for instance, one microsecond. The series of the film's sprocket holes, or a like pattern, may be used to trigger synchronously the flash tube.

The images are displayed or projected in sequence on a screen having a surface sufficiently diffusing to permit observation even at grazing angles without excessive drop in luminance. The screen is dynamic, i.e., its surface plane is displaced back and forth along the optical path, although its physical surface may travel in a direction substantially at right angles to the optical path. This scanning or "sweeping" motion of the surface plane is made synchronous with the sequence projection, and the scan amplitude and uniformity are such that the successive frames occupy successive positions on the screen surface which are uniformly positioned spatially and temporally. When the cycle is repeated with sufficient frequency, the cerebral cortex, owing to retinal image retention, perceives each image continuously and the sequential projection as a three-dimensional continuum whose component layers (the separate sections) appear simultaneously present in their natural order and spacing. For best results each image is repeated at least twelve times per second, preferably at least thirty times per second. Below these frequencies a more or less noticeable flicker occurs depending upon the brightness and the nature of the images and may interfere with satisfactory observation of the image.

A preferred embodiment of the projection screen is a spiral wheel, or an "Archimedes wheel," and consists of a modified cylinder rotating about an axis within a cylinder. The distance between the axis of rotation and the periphery of the wheel, uniformly increases from a minimum to a maximum; the maximum peripheral distance is adjacent the minimum, but about 360° removed in the direction of rotation. There is a sharp step from the maximum to the minimum position in the direction of rotation. The radial distance between a point half an image-diagonal away from the maximum dimension and a point half an image-diagonal away from the minimum dimension substantially equals the height, or third dimension (or Z coordinate), of the image to be produced. The periphery of the wheel is, in several advantageous embodiments, made of frosted glass or plastic and acts as a projection screen.

On a spiral projection wheel, the images of the successive photographs on the surface lie in mutually overlapping curved planes located respectively farther and farther from the axis of rotation (or closer and closer, according to the direction of rotation) thus each axially extending surface unit area is at a distance from the axis of rotation, different from the distances of all other axially-extending surface unit areas. This results in the optical illusion that the two-dimensional images of the photographs are situated in space, one above the other, in their original, natural relationship. The curvature of the wheel is usually of little significance provided that the ratio of the mean radius vector to the frame width is kept sufficiently large.

In other embodiments instead of a spiral, the screen surface may alternatively follow a multiple spiral, or any other suitable curve designed for preferably constant and uniform back and forth motion along the optical path, or may be a helix, or a reciprocating flat screen, etc. In the case for example of two opposedly oriented spirals on a single wheel, as also in the case of a reciprocating screen, to each complete rotation, or cycle, of the screen correspond two complete sequences of photographs, and these must be positioned on the film drum in such manner as to insure their close coincidence in the space-time solid: i.e., the photographs of the one strip are arranged in the reverse order of the photographs of the other although in the same orientation, unless only one-half cycle is used.

Where the projection screen is in the form of a helix, the screen may be arranged about an axis of rotation with each radially extending unit surface area of the screen substantially at a right angle to the axis of rotation. The optical path, at least the portion of it impinging on the screen, may be substantially parallel to the axis of rotation. The helix preferably extends for about 360° about the axis, with the two ends spaced apart along the axis a distance substantially equal to the height of the image to be produced. Thus projection of successive frames on appropriate and overlapping portions of the helix produces the illusion of a three-dimensional image in space according to the same principle applied in the case of the spiral screen. Multiple helices may be utilized.

The projection screen may be flat and made to reciprocate with a stroke or cycle coinciding with the movement of the photograph through the optical train. As each frame is centered in an optical path, stroboscopic light is projected through the photograph and onto a screen which is moved reciprocally at right angles to its plane of orientation and along the optical path. The speed of reciprocation may be synchronized with the speed of the movement of the photographs. Again, the illusion of a three-dimensional image standing still in space is created.

In FIGURE 1, apparatus 10 is shown in part to be comprised of a transparent window 12 set in a frame 14. A three-dimensional image 16 is shown to be comprised of a plurality of two-dimensional images 18A through 18T of reproductions of sections through a specimen, for instance an egg. The images are aligned, one above the other. Each image is produced by a transparent photograph of a layer of the three-dimensional object. Image 18A is an image of the reproduction of the lowest layer of the specimen, image 18B, the next higher, and so on, image 18T being an image of the reproduction of the highest layer of the specimen.

FIGURE 4 schematically illustrates an embodiment of the invention. In the apparatus 50, light from a lamp 52 is reflected by a mirror 54 along an optical path 56 and passes through condensing lenses 58 and 60. The light passes through a mask 61 made in accordance with the present invention then passes through a gate 62 and is reflected by a mirror 64 through a projection lens 66 and dove prism 68.

For those rare cases where ambiguity might arise from the curvature of the screen wheel 76 owing to the particular morphology of some objects, the projection apparatus of the invention may be provided with a dove prism 68 in the optical path. The dove prism 68 affords rotation of the three-dimensional image about the projection axis, thereby, in effect, changing the direction in which the curvature of the wheel distorts the image so as to substantially eliminate the distortion from certain cross-sections.

The dove prism is also useful to accomplish rotation for photographic or cinematographic recording or for group demonstrations. Similarly, the dove prism facilitates inspection of the three-dimensional image by the operator without moving from his place.

The light may be reflected through a series of mirrors 70, 72, 74, as may be required for a particular configuration of the apparatus. The light then strikes the surface of the spiral screen wheel 76 which is made up of a plurality of segments 78, 80, 82 and 84, each covered with a translucent material and each similar to the other and varying from a low point 86 at the base of a step 88 to a high point 90 at the top of the next succeeding step.

A circular drum 92 is disposed in the optical path, for instance between the gate 62 and the mirror 64 as shown in the drawing, and has on its surface a plurality of serial, transparent photographs 94A through 94T of object sections.

The images of the sequential photographs 94A–94T are projected, superimposed, on the rotating spiral screen wheel 76. The stroboscopic lamp 52 is arranged to flash successively when successive photographs 94A–94T are centered in the optical path 56. In all such embodiments the screen and wheel are synchronized so that the reproductions of the lowest sections of the object are projected onto the short radius portion of the screen, the reproductions of the highest sections on the long radius portion, with the remainder respectively located between them. Both the drum and screen are rotated at high speed. The light that passes through each frame is projected onto the screen producing a series of images that appear in a three-dimensional stack. As the screen wheel 76 rotates, it will be understood that the spiral surface appears constantly rising (or constantly falling, according to rotation direction), and therefore that the series of projected frames always travels in the same direction; any one complete frame sequence coincides with one complete drum revolution, and the flash-projected frames are successively "stopped" or "frozen" on successively higher (or lower) levels. The illusion is created that the three-dimensional object is being seen in its entirety at one time.

A number of spaces 96 are blacked-out. The blacked-out spaces 96 correspond to the passage of the steps in the spiral wheel through the three-dimensional image. If useful projection were effected during this passage, the resulting three-dimensional image 16 would be split in two, part of each section falling on the low end of a spiral and other part on the high end of the next spiral. In one advantageous form of this embodiment, seventy-five percent of the drum surface may be covered with useful photographs, and about twenty-five percent blacked-out.

As shown in FIGURE 4, the screen may be made with a plurality of spirals so that more than one cycle appears for each full rotation of the screen. In such an embodiment, which has the advantage of reducing noise and vibration to a minimum, the curvature of the screen surface may preferably be a composite of two or more (four being illustrated) equally oriented, identical segments of spirals; the screen speed is then synchronized so as to be a fraction of the speed of the film drum corresponding to the number of spiral segments. This form provides a naturally well-balanced drum, which rotates at a substantially reduced speed and affords a desired reduction in noise, vibration, wear, etc. A limiting factor in the practical number of spiral segments is the degree of curvature of the spiral segments, as a function of the acceptable degree of curvature of planes in the synthesis; another limiting factor corollary to the preceding one, is the possible height of the synthesis, which decreases with the increase of the number of segments, itself a function of the degree of curvature.

One practical set of parameters consists of a 16 mm. film strip having 60 to 70 photographs and mounted on 4.5 inch radius transparent drum. The screen is composed of four spiral segments having a useful width of five inches and radius vector lengths of nine to twelve inches. The projected image is about three inches by four inches and produces a three-dimensional image about two inches high.

The film drum rotation rate may be as little as 1200 r.p.m. Such a rotation rate provides 20 sequences per second, each sequence corresponding to a stroke of one of the spiral segments, and therefore also corresponding to a complete build-up of the three-dimensional image, which may include, for the film drum size indicated, about sixty photographs corresponding to a spatial frequency of 30 sections per inch and a flash frequency of 1200 (20 times 60) cycles per second, each flash peak duration being of the order of a microsecond. It has been found that a xenon compact arc lamp, such as manufactured by the Hanovia Company as Model No. DL–5022–100 provides sufficient illumination for a synthetic solid image having a length of four inches and a width of three inches to be comfortably examined at substantially photopic level in a subdued ambient light. The four spiral screen wheel rotates at one-fourth of the film drum speed, that is, 300 r.p.m.

The triggering of the flash of the lamp 52 may be accomplished by passing light from an exciter lamp 98 through an indexing hole 100 on the surface of the film drum 92 onto a photo-receptor 102 which converts the light pulse into an electrical pulse that is carried by conduit 104 to a signal amplifier 106 and then to a high voltage power supply 108 which triggers the lamp.

Intense flashes of white light may be produced by the arc discharges of the stroboscopic lamp 52 which may be a xenon tube. For efficient operations of such a triggering device the area between the indexing holes is preferably opaque. Where a motion picture film strip is used as the series of photographs on film drum 92, the sprocket holes may be utilized as a light chopper.

The photographs 94A–T and the gate 62 have been shown spaced some distance apart but it is to be understood that they must be relatively close to each other in order that they will be sharply focused by lens 66 on surface 75.

For best results, the lens 66 provides considerable depth of field and of focus. To this effect the lens desirably has a relatively small aperture in order that the solid angle that the aperture subtends at the film and gate, on the one hand, and at the mid-point of the screen travel, on the other, be sufficiently small to cause insignificant spread of the circle of confusion in planes closer to and farther from the middle plane. This latter does not affect the light efficiency because the lamp 52 may be focused so as to substantially fill only the entrance pupil of lens 66.

Referring now to FIGURES 5 through 10, a specific embodiment of FIGURE 4 will be described in detail. The apparatus shown generally as 200 is made up of a frame 202 and a housing 204 connected to the frame and surrounding the operable portions of the apparatus in order to protect them and to present a pleasing appearance.

The frame 202 is comprised of a base 206 which may be made of a thick aluminum plate, which is 1½ inches thick in one advantageous embodiment. Structural members 208, 210 and 212 are connected to the base 206, for instance by bolting, and may be comprised of aluminum, which is one inch thick in one advantageous embodiment. Optical bench members 214, 216 and 218, which may be cast aluminum, are mounted on the base 206.

A motor 220 is supported on the base 206. The motor 220, by means of a timing pulley 222, a timing belt 224, and a timing pulley 226, drives a shaft 228 on which is mounted a film drum 230 having a transparent cylinder 232, made, for instance, of a clear plastic, such as methyl methacrylate, and being ¼ inch thick in one advantageous embodiment. The cylinder is fitted on the periphery of the drum 230 and overhangs on the side opposite the motor. On the same shaft 228, is mounted a timing pulley 234 which by means of a timing belt 236 and timing pulley 238 drives a shaft 240 on which is mounted a screen drum 242. The pulley 238 has four times more timing notches than the pulley 234 in order to achieve a speed one-fourth that of pulley 234. That is, the ratio of the size of pulley 238 to pulley 234 is 4:1. The shafts 228 and 240 are rotatably fastened to the structural members 208, 210 and 212.

Mounted on the optical bench composed of members 214, 216 and 218 is a gate 244 and a succession of mirrors 246, 248, 250 and 252, and lens 254 and a dove prism 256 which together define an optical path 262. Light from a stroboscopic lamp 258 is reflected by reflector 260 along the optical path 262 and passes through a condenser lens 264 made up of component lenses 266 and 268. The light passes through one of the photographs 270 on the film drum 230 and is reflected by the mirror 246 through the lens 254 and the mirrors 248, 250 and 252 onto the diffusing screen wheel 242 where, due to the rotation and timing of the components, a three-dimensional image 274 is produced inside a clear plastic dome 276 mounted on the housing 204.

Figure 8:
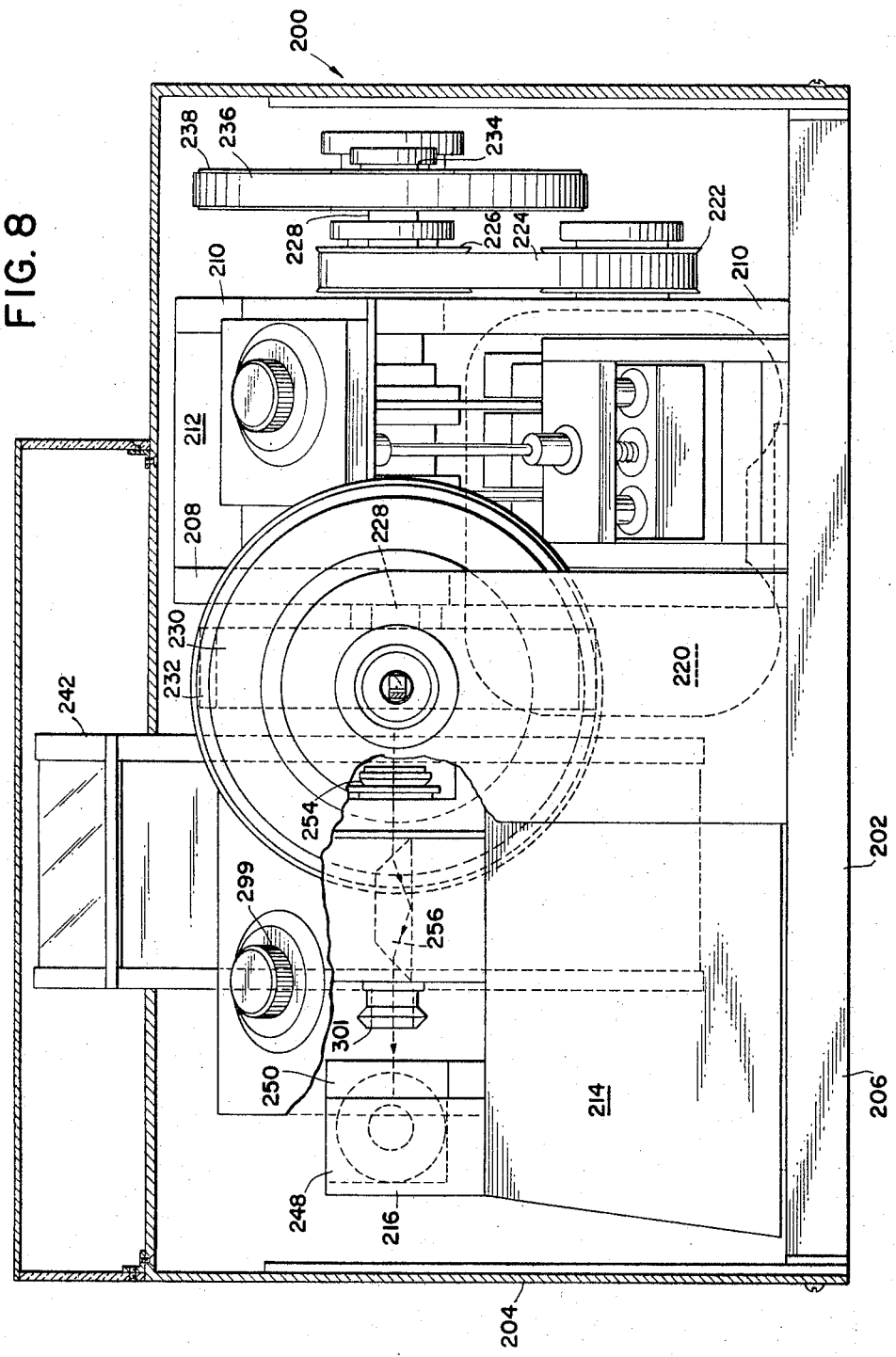
FIGURE 8 is a front elevational view, from the operator's position of the apparatus of FIGURE 5 taken generally along lines 8—8 of FIGURE 5.

The dove prism 156 may be rotated by rotating control knob 299 (FIGURE 8). The control knob 299 is connected by a shaft and gear (not shown) to gear 301 which is connected to the dove prism 256.

Figure 5:
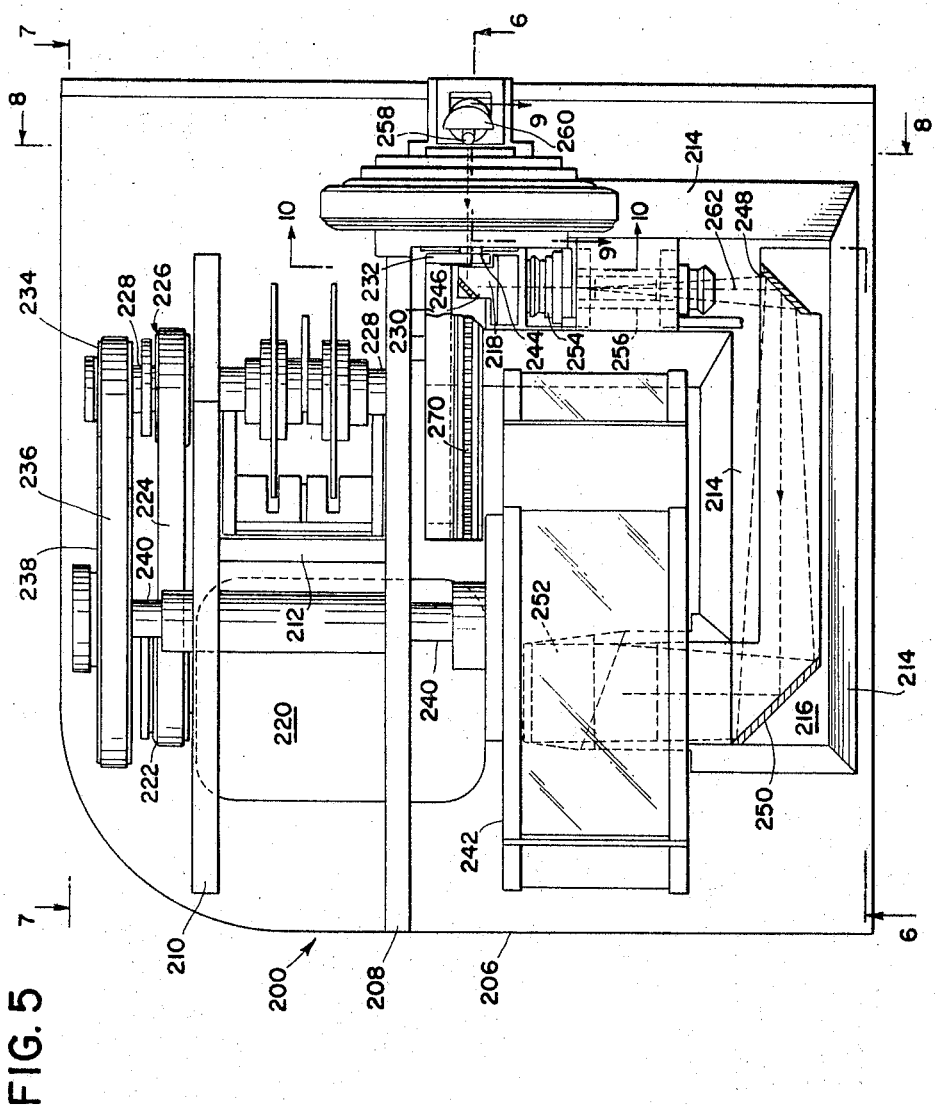
FIGURE 5 is a plan view of apparatus embodying the principles of this invention.
Figure 6:
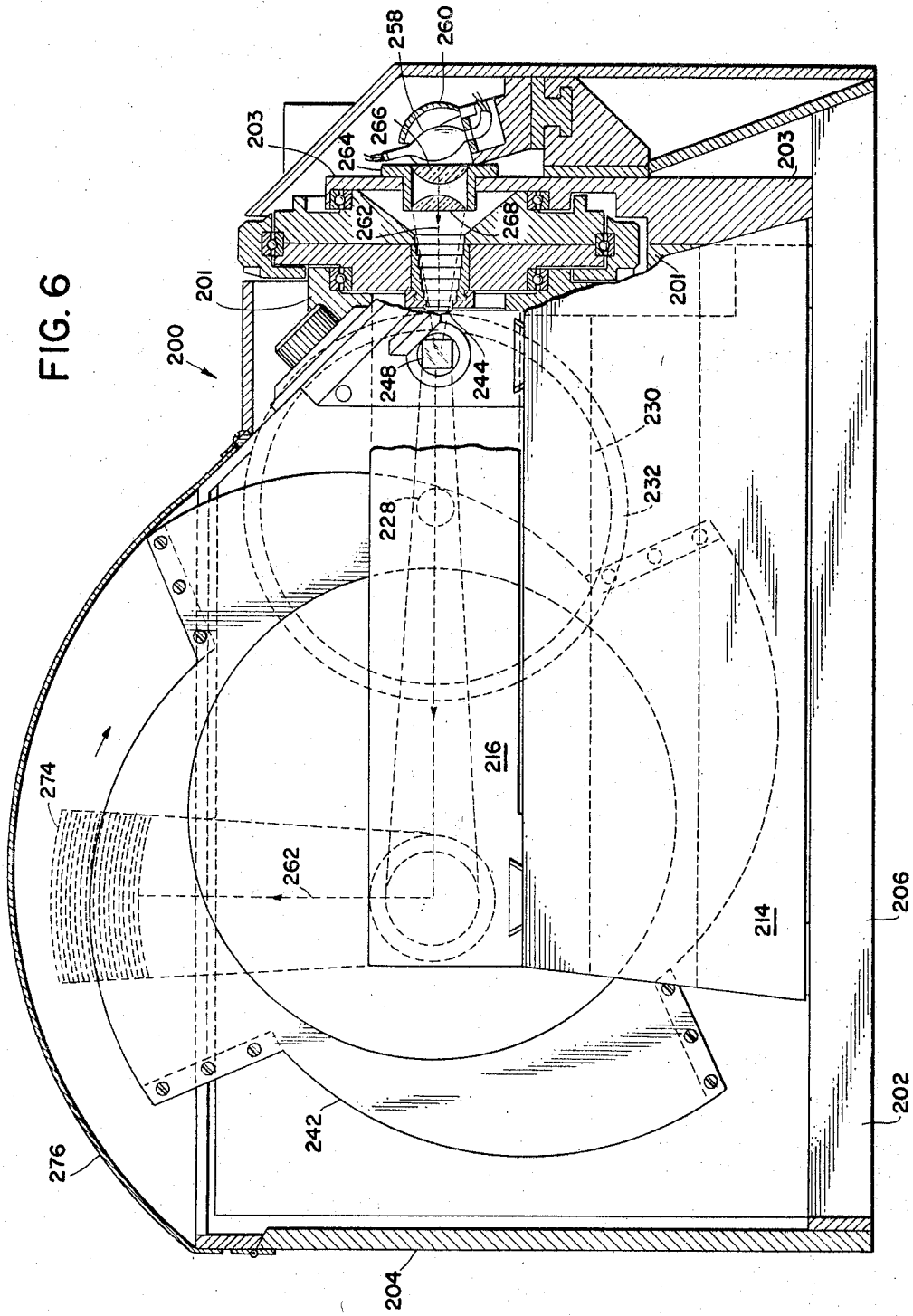
FIGURE 6 is a cross-sectional view of the apparatus of FIGURE 5 taken generally along lines 6—6 of FIGURE 5.
Figure 7:
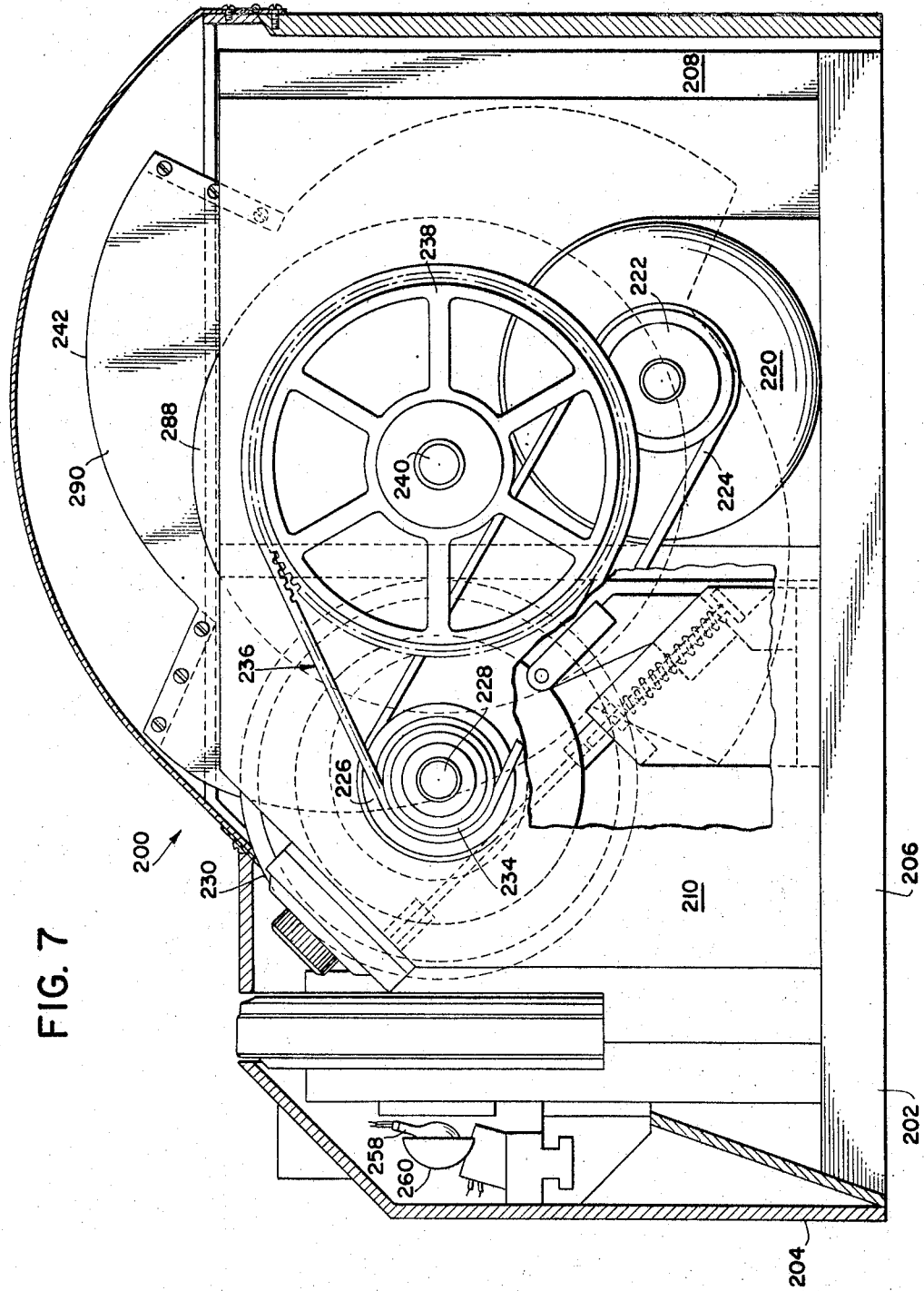
FIGURE 7 is a cross-sectional view of the apparatus of FIGURE 5 taken generally along lines 7—7 of FIGURE 5.
Figure 9:
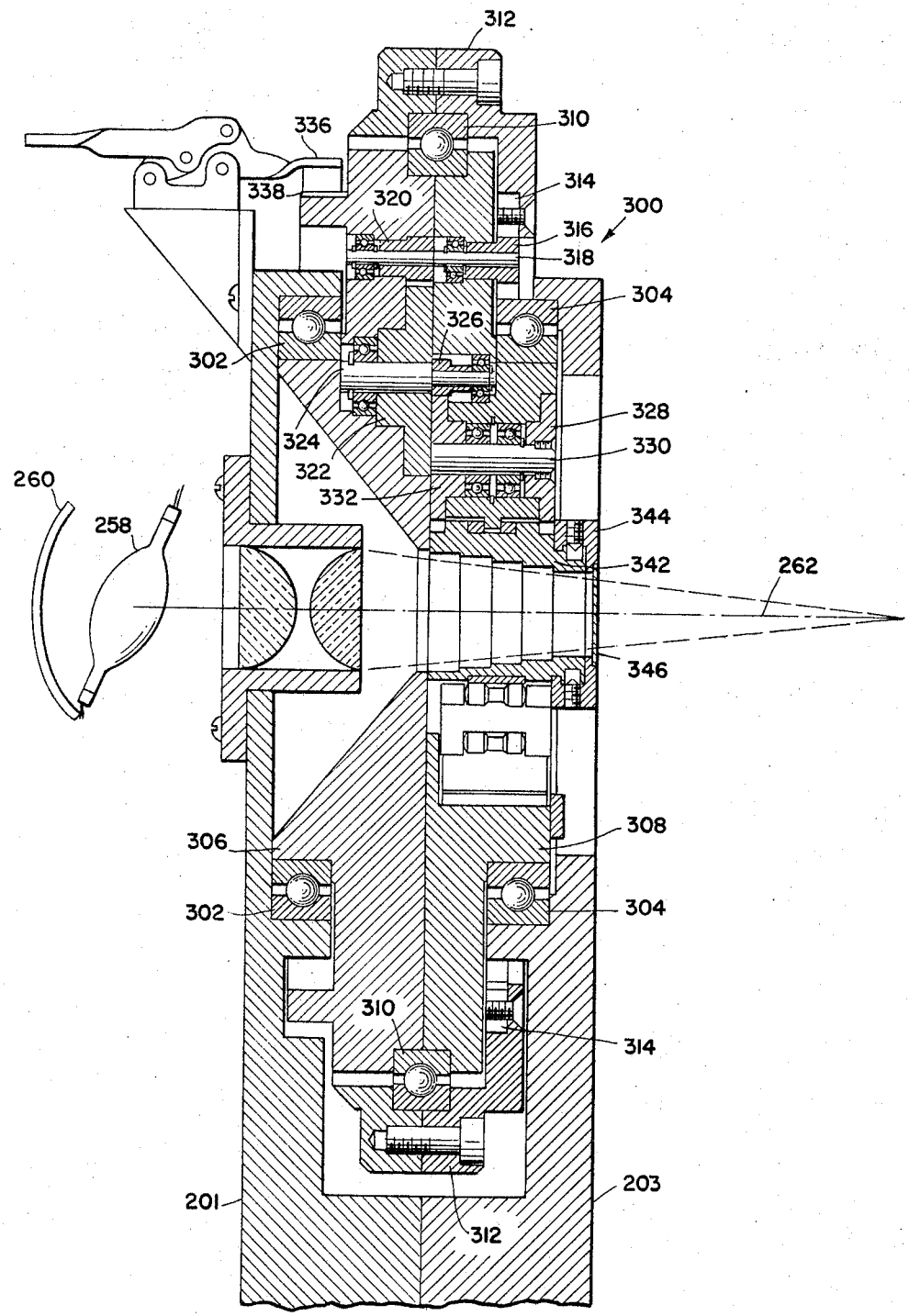
FIGURE 9 is a detail view taken generally along lines 9—9 of FIGURE 5 showing details of the optical dissector of this invention.
Figure 10:
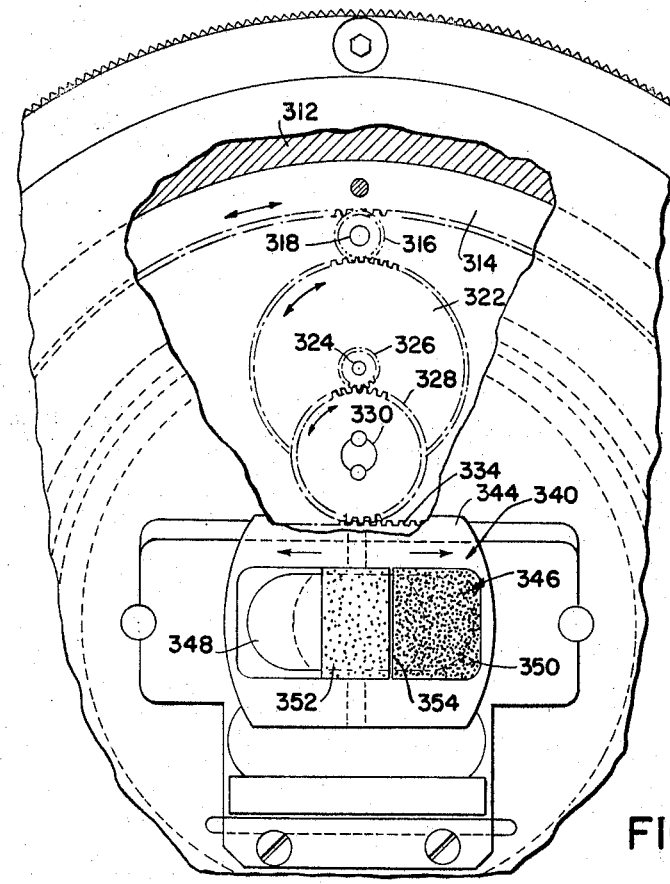
FIGURE 10 is a partial detail view taken generally along lines 10—10 of FIGURE 5 and partly broken away to show details of the optical dissector of this invention.

Turning now to FIGURES 9 and 10, optical dissector 300 cooperates with support members 201 and 203 as shown in FIGURE 6. The support members 201 and 203 support bearings 302 and 304 which in turn support front and rear dissector housing members 306 and 308. The housing members 306 and 308 are bolted together clamping between them the inner race of a bearing 310. Bearing 310 supports dissector control wheel 312.

Fastened to the dissector control wheel 312 is a control internal gear 314 which rotates with it. The control internal gear 314 engages a dissector drive gear 316 which is fastened to a common shaft 318 with a similar drive gear 320. Gear 320 engages a large idler gear 322 which is fastened to a common shaft 324 with a small idler gear 326. The small idler gear 326 engages a dissector gear 332 which is fastened to a common shaft 330 with a similar dissector gear 328. The dissector gears 328 and 332 engage a rack gear 334 on a dissector sub-assembly 340.

A brake shoe 336 engages a knurled surface 338 of rear housing 306 and prevents the entire dissector from rotating on bearing 302, but permits rotation on bearing 310 only. Turning the control wheel 312 when the brake shoe is depressed causes the entire gear train to react thereby transmitting the rotary motion of control wheel 312 to the linear motion of the optical dissector sub-assembly 340 allowing it to traverse back and forth to the limit of its rack 334.

Upon releasing or raising the brake 336 and continuing rotation of the dissector control wheel 312, linear motion is discontinued and rotation of the entire dissector 300 on bearings 302 and 304 is allowed.

The dissector sub-assembly 340 is comprised of a frame 342 to which is fastened a cover plate 344. The cover plate retains a dissector mask 346 in a predetermined position. The dissector mask 346 is comprised of a transparent material, such as glass, and has a clear zone 348, an opaque zone 350, a zone 352 of reduced transmittance, and a clear slit 354 disposed between the opaque zone 350 and zone 352 of reduced transmittance. The opaque zone 350 and the reduced transmittance zone 352 may be formed by adding appropriate sheets of plastic or glass, or by applying appropriate coatings. The mask is disposed across the optical axis. Rotation of the dissector control wheel 312 when the brake is released, causes the mask to rotate about the optical axis and at right angles to it. Rotation of the dissector control wheel with the brake engaged, causes the mask assembly to traverse back and forth across the optical axis bringing successively into position the clear zone 348, the zone of reduced transmittance 352, the slit 354 or the opaque zone 350.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. For instance, the invention has been described with regard to transparencies and the apparatus arranged for transmission of light through the transparencies. However, opaque photographs may be used and viewed or projected by use of reflected light techniques. Furthermore, a plurality of optical paths may be used, particularly in connection with the helix embodiment, in order to display a plurality of three-dimensional images simultaneously.

What is claimed is:

1. In an apparatus for forming and displaying a three-dimensional image of a three-dimensional object by projecting a series of two-dimensional photographs of successive layers of said object successively onto a viewing screen where the series of two-dimensional images of said photographs appear as said three-dimensional image of said object, the improvement comprising an optical mask having zones of different light transmittance, first means to rotate said mask about the axis of the optical path in said apparatus, and second means to move said mask across said optical path so that said zones of different light transmittance are selectively disposed in said optical path thereby displaying with selective illumination any desired section of said three-dimensional image.

2. A device according to claim 1, wherein said optical mask comprises a first zone which is optically clear, a second zone which is optically opaque, a third zone which has reduced light transmittance, and an optically clear slit between said opaque zone and said zone of reduced light transmittance.

3. A device according to claim 1, wherein said optical mask comprises first and second zones which are optically opaque, and a third optically clear zone between said first and second opaque zones.

4. A device according to claim 1, wherein said optical mask comprises a plurality of optically clear zones separated by optically opaque zones.

5. A device according to claim 1, wherein said optical mask comprises a cylindrical lens disposed between first and second optically clear zones.

6. A device according to claim 1, wherein said optical mask comprises a cylindrical lens disposed between first and second zones of reduced light transmittance.

7. A device according to claim 1, wherein said first means to rotate said mask comprises a first housing substantially circular in configuration, means to connect said mask to said first housing and bearing means supporting said first housing.

8. A device according to claim 1, wherein said second means to move said mask across said optical path comprises a second housing substantially circular in configuration, an arcuate gear connected to said second housing, a frame for holding said mask, a rack gear connected to said frame, and a gear train connecting said arcuate gear of said second housing to said rack gear of said frame.

9. In a method of forming and displaying a three-dimensional image of a three-dimensional object by moving two-dimensional photographs of successive sections of said object successively through a predetermined optical path and projecting the two-dimensional images of said photographs on a screen which is moving back and forth in said optical path, the improvement of optically dissecting said three-dimensional image comprising varying with a mask the amounts of light transmittance along said optical path to different portions of said screen so that a selected portion of said three-dimensional image appears brighter than another portion.

10. A method as defined in claim 9 further comprising completely blocking said light transmittance to a portion of said screen.

11. A method as defined in claim 9 further comprising reducing the amount of light transmittance to a portion of said screen.

12. A method as defined in claim 9 further comprising changing the different portions of said screen where the amounts of light transmittance are varied while the three-dimensional image is under observation.

13. In a method of forming and displaying a three-dimensional image of a three-dimensional object by moving two-dimensional photographs of successive sections of said object successively through a predetermined optical path and projecting the two-dimensional images of said photographs on a screen which is moving back and forth in said optical path, the improvement of optically dissecting said three-dimensional image comprising varying with a refractive mask the light transmittance along said optical path to concentrate light on a portion of said screen so that a selected portion of said three-dimensional image appears brighter than another portion.

References Cited

UNITED STATES PATENTS

| 1,488,027 | 3/1924 | Runcie | 352—43 |
| 1,927,925 | 9/1933 | Dieterich | 352—86 |
| 2,361,390 | 10/1944 | Ferrill. | |
| 2,424,592 | 7/1947 | Terwilliger | 352—43 |
| 2,891,339 | 6/1959 | Kao. | |

JULIA E. COINER, *Primary Examiner.*

U.S. Cl. X.R.

352—61, 85